(12) United States Patent
Mallegowda et al.

(10) Patent No.: US 11,871,108 B2
(45) Date of Patent: Jan. 9, 2024

(54) INTEGRATED INTERNAL AND REMOVABLE BATTERY POWER MANAGEMENT FOR IMAGE CAPTURE DEVICE

(71) Applicant: GoPro, Inc., San Mateo, CA (US)

(72) Inventors: Shiva Kumar Belavadi Mallegowda, Belmont, CA (US); Naveen Chinya Krishnamurthy, Fremont, CA (US); Kevin Hinge, Danville, CA (US); Rajesh Madhur, San Jose, CA (US); Joseph Tucker, Foster City, CA (US)

(73) Assignee: GoPro, Inc., San Mateo, CA (US)

(*) Notice: Subject to any disclaimer, the term of this patent is extended or adjusted under 35 U.S.C. 154(b) by 296 days.

(21) Appl. No.: 17/469,965

(22) Filed: Sep. 9, 2021

(65) Prior Publication Data

US 2022/0086347 A1 Mar. 17, 2022

Related U.S. Application Data

(60) Provisional application No. 63/078,722, filed on Sep. 15, 2020.

(51) Int. Cl.
*H04N 23/65* (2023.01)
*H02J 7/00* (2006.01)

(52) U.S. Cl.
CPC .......... *H04N 23/65* (2023.01); *H02J 7/0045* (2013.01); *H02J 7/00712* (2020.01); *H02J 2207/30* (2020.01); *H02J 2310/22* (2020.01)

(58) Field of Classification Search
CPC ....... H04N 23/65; H04N 23/51; H02J 7/0045; H02J 7/00712; H02J 2207/30; H02J 2310/22; H02J 9/061; H02J 7/34
See application file for complete search history.

(56) References Cited

U.S. PATENT DOCUMENTS

| 5,006,881 | A | * | 4/1991 | Kodama | G03B 7/26 396/176 |
|---|---|---|---|---|---|
| 9,263,898 | B1 | * | 2/2016 | Ghazarian | G08B 21/182 |
| 2008/0136913 | A1 | * | 6/2008 | Berkey | G05B 19/4062 348/154 |
| 2019/0230413 | A1 | * | 7/2019 | Honjo | H04W 76/19 |
| 2021/0075938 | A1 | * | 3/2021 | Nakamura | H04N 23/555 |
| 2021/0186634 | A1 | * | 6/2021 | Jarc | A61B 90/361 |

* cited by examiner

*Primary Examiner* — Hung H Lam
(74) *Attorney, Agent, or Firm* — Young Basile Hanlon & MacFarlane, P.C.

(57) ABSTRACT

A method and system for continuously supplying power to an image capture device during an image capture session are disclosed. The image capture device includes an integrated internal battery located internal to the image capture device and a removable battery connected to the image capture device. Power is provided to the image capture device from the removable battery. When the removable battery is disconnected from the image capture device, power is provided to the image capture device from the integrated internal battery. When a new removable battery is connected to the image capture device, power is provided to the image capture device from the new removable battery. Power is continuously supplied to the image capture device from the integrated internal battery while the removable battery is disconnected and replaced with the new removable battery.

20 Claims, 8 Drawing Sheets

FIG. 8

INTEGRATED INTERNAL AND REMOVABLE BATTERY POWER MANAGEMENT FOR IMAGE CAPTURE DEVICE

CROSS REFERENCE TO RELATED APPLICATIONS

This application claims priority to U.S. Provisional Application No. 63/078,722, filed on Sep. 15, 2020, the entire disclosures of which are hereby incorporated by reference.

TECHNICAL FIELD

This disclosure relates to image capture devices, and more particularly, to an image capture device with an integrated internal battery and a removable battery configured so that an image capture session is not interrupted while replacing the removable battery.

BACKGROUND

In some image capture devices, the device is powered by a single power source (e.g., a battery). When the battery needs to be replaced, the image capture device cannot operate normally because the image capture device is not connected to any power source. If the battery needs to be replaced during an image capture session, that image capture session is interrupted while the battery is replaced. This interruption is not desirable, because it is possible that a user of the device misses what they consider to be an important part of the image capture session while the battery is being replaced. In some image capture devices, when the battery is replaced, the device may need to be restarted, further extending the length of the interruption of the image capture session.

It is therefore desirable to have a system and method for being able to replace a battery in an image capture device while not interrupting an image capture session.

SUMMARY

Disclosed herein are implementations of a system and method for replacing a battery in an image capture device while not interrupting an image capture session. A method of continuously supplying power to an image capture device during an image capture session. The method includes one or more of the following steps. Providing power to the image capture device from a removable battery connected to the image capture device. Detecting when the removable battery is disconnected from the image capture device. Providing power to the image capture device from an integrated internal battery of the image capture device, when the removable battery is disconnected from the image capture device. Detecting when a new removable battery is connected to the image capture device. Providing power to the image capture device from the new removable battery, when the new removable battery is connected to the image capture device. Continuously supplying power to the image capture device from the integrated internal battery while the removable battery is disconnected and replaced with the new removable battery.

A system configured to continuously supply power to an image capture device during an image capture session. The system including one or more of the following components. An integrated internal battery located internal to the image capture device. A removable battery removably connected to the image capture device. A power management integrated circuit located internal to the image capture device, the power management integrated circuit configured to perform one or more of the following steps. Provide power to the image capture device from the removable battery. Detect when the removable battery is disconnected from the image capture device. Provide power to the image capture device from the integrated internal battery when the removable battery is disconnected from the image capture device. Detect when a new removable battery is connected to the image capture device. Provide power to the image capture device from the new removable battery when the new removable battery is connected to the image capture device. Continuously supplying power to the image capture device from the integrated internal battery while the removable battery is disconnected and replaced with the new removable battery.

A method of adjusting settings of an image capture device based on a current power level of the image capture device is described. The current power level of the image capture device is determined. A current set of settings of the image capture device is determined. Whether the current power level can drive the current set of settings is determined. When the current power level cannot drive the current set of settings, a proposed adjusted set of settings of the image capture device is determined, wherein the proposed adjusted set of settings is based on the current power level and is different from the current set of settings. The settings of the image capture device are adjusted to the proposed adjusted set of settings after receiving confirmation from a user of the image capture device to use the proposed adjusted set of settings.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A method and system for continuously supplying power to an image capture device during an image capture session are disclosed. The image capture device includes an integrated internal battery located internal to the image capture device and a removable battery connected to the image capture device. Power is provided to the image capture device from the removable battery. When the removable battery is disconnected from the image capture device, power is provided to the image capture device from the integrated internal battery. When a new removable battery is connected to the image capture device, power is provided to the image capture device from the new removable battery. Power is continuously supplied to the image capture device from the integrated internal battery while the removable battery is disconnected and replaced with the new removable battery.

Figure 1A:
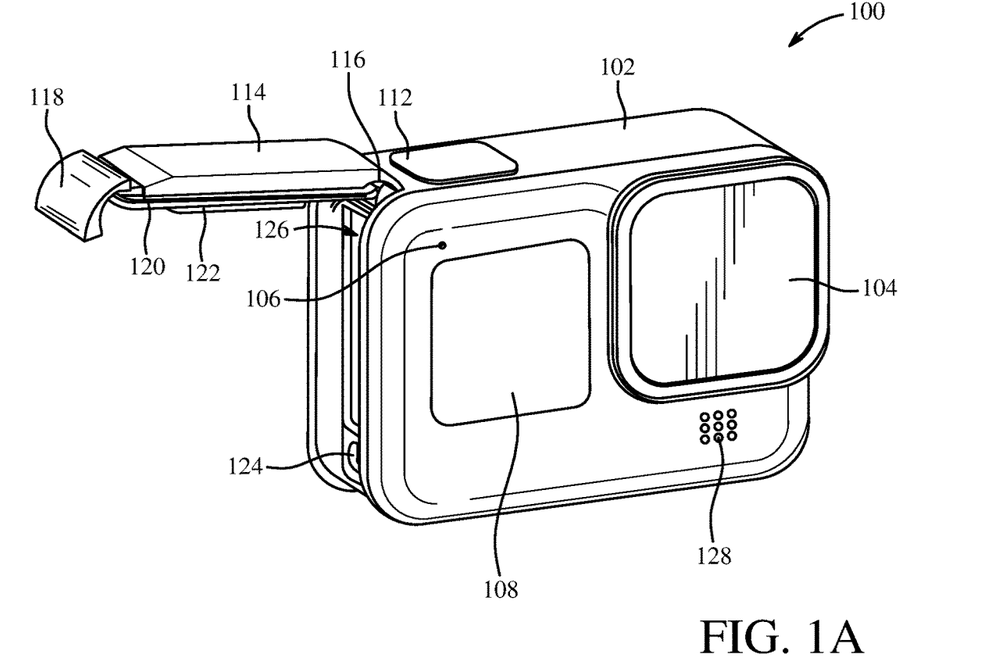
FIGS. 1A-B are isometric views of an example of an image capture device.
Figure 1B:
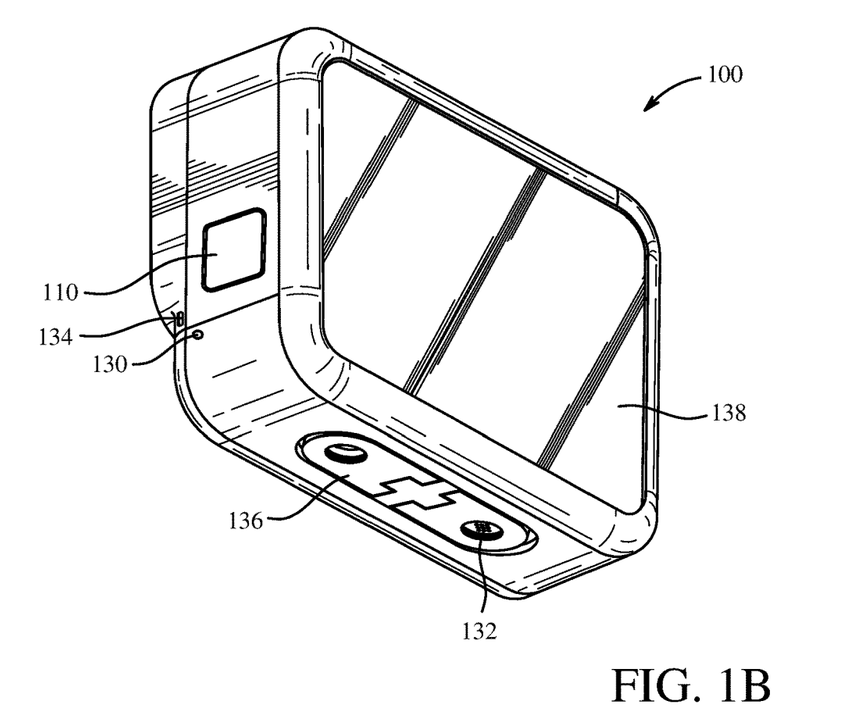

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

The image capture device 100 may be used to implement some or all of the techniques described in this disclosure, such as the techniques described in FIGS. 4-7.

Figure 2A:
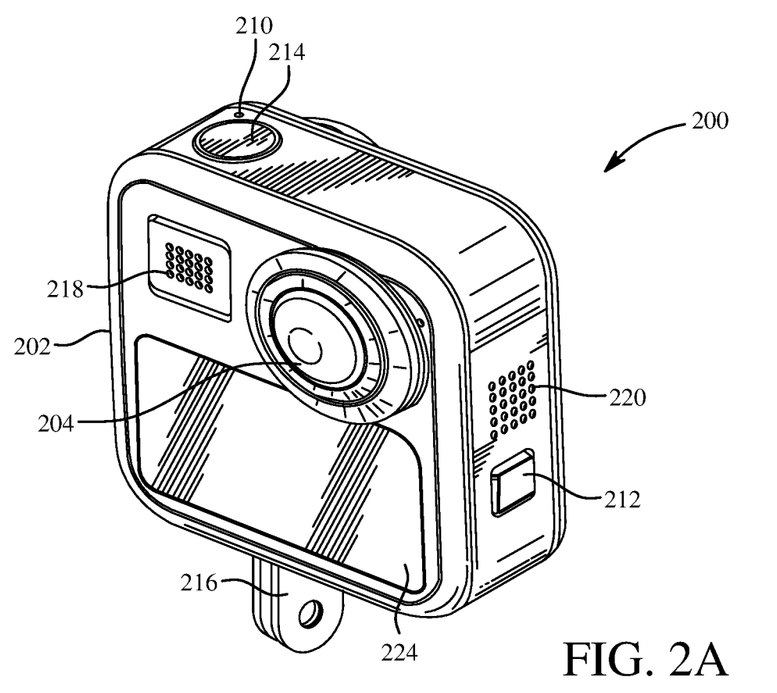
FIGS. 2A-B are isometric views of another example of an image capture device.
Figure 2B:
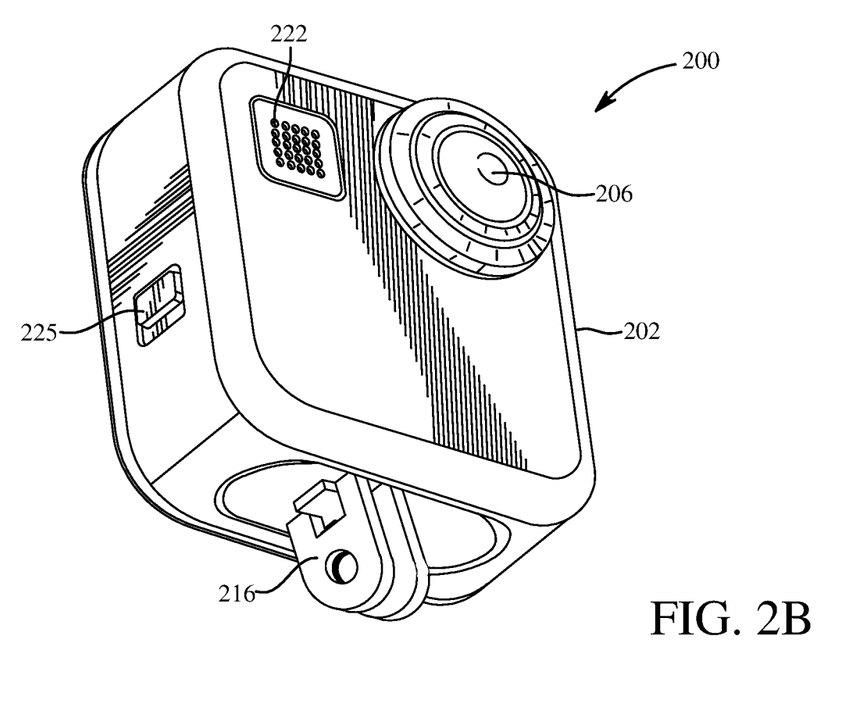

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

The image capture device 200 may be used to implement some or all of the techniques described in this disclosure, such as the techniques described in FIGS. 4-7.

Figure 3:
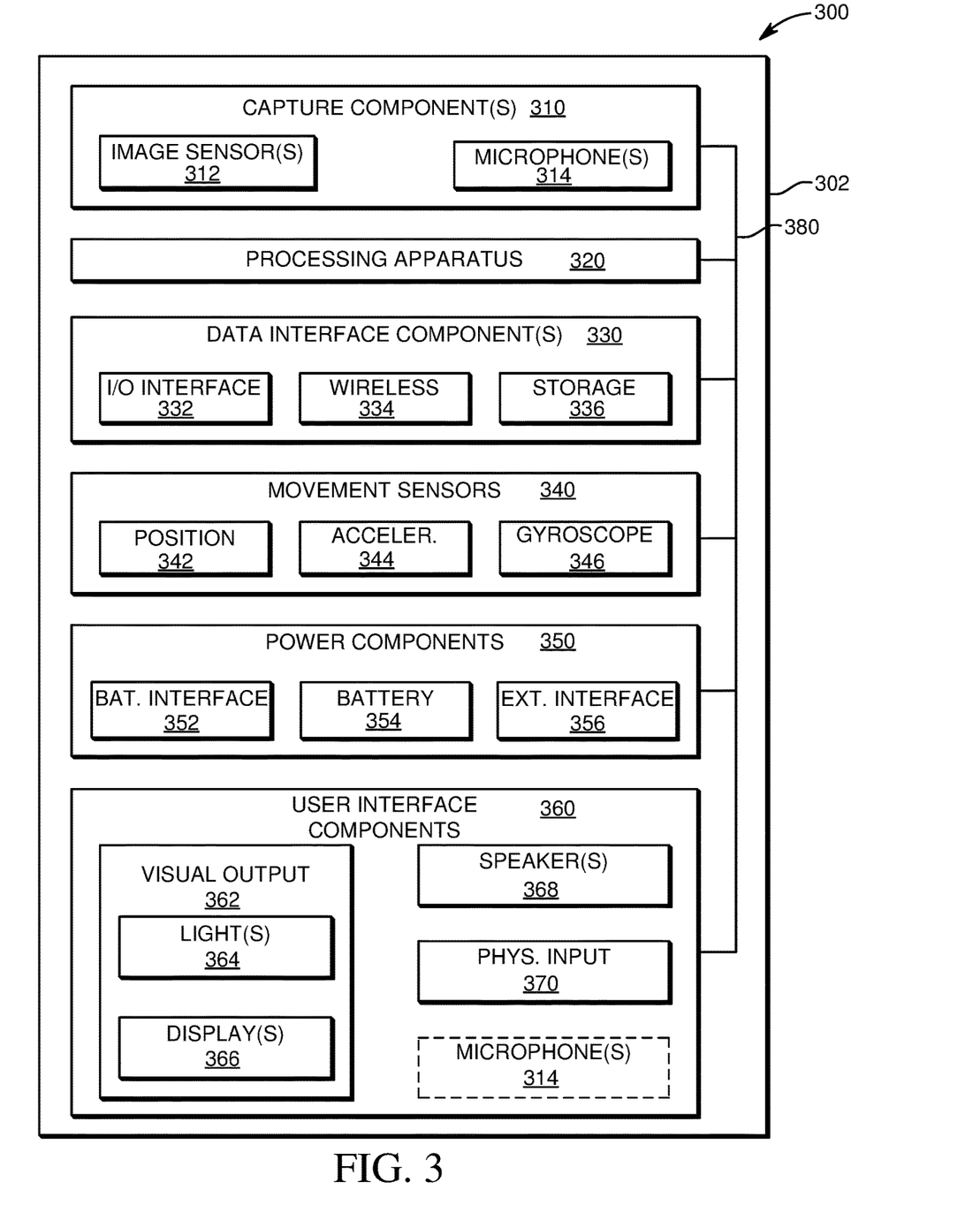
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the techniques described in FIGS. 4-7.

Figure 4:
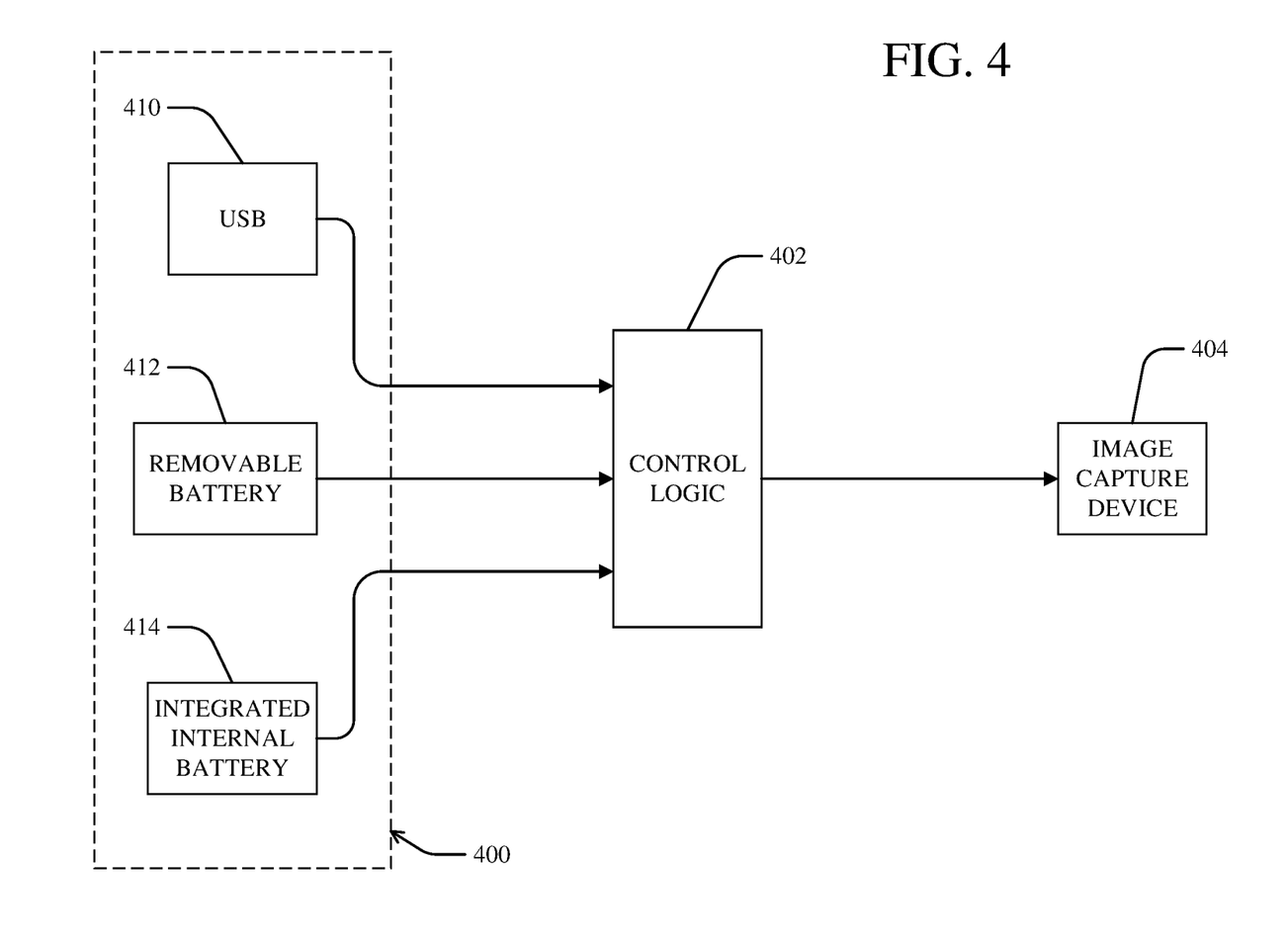
FIG. 4 is a power schematic of an image capture device when multiple power sources are present.

FIG. 4 is a power schematic illustrating how power is provided to an image capture device when multiple power sources are present. Power sources 400 provide power through control logic 402 (described in FIG. 5) to an image capture device 404 to be powered. The power sources 400 include any one or more of a USB source 410, a removable battery 412, and an integrated internal battery 414.

The USB source 410 may include any type of wired or wireless power source. The removable battery 412 is a battery or power source that is connected to and removable from the image capture device 404. The removable battery 412 may be any battery that is inserted into the image capture device 404 (e.g., slides into and out of the image capture device 404). The removable batter 412 may be connected to a frame surrounding the image capture device 404. The removable power source may be connected to the image capture device 404 by a cable, for example, by a USB cable. The USB source 410 may power the image capture device 404, recharge the removable battery 412, recharge the integrated internal battery 414, or a combination thereof. The USB source 410 may power the image capture device 404 while recharging the removable battery 410 or the integrated internal battery 414.

The integrated internal battery 414 is a battery or power source located internal to the image capture device 404. The integrated internal battery 414 is a small device, meaning that it provides a limited amount of power, less than an amount of power provided by the USB source 410 or the removable battery 412. The integrated internal battery 414 may provide a short period of time (for example, a few minutes) to continue to operate the image capture device 404 until a USB source 410 or a removable battery 412 is connected. The internal battery 414 may provide power for 1 minute or more, 2 minutes or more, 4 minutes or more, or even 5 minutes or more. The internal battery 414 may provide power for 30 minutes or less, 20 minutes or less, or 15 minutes or less. As discussed herein the image capture device 404 includes three power sources 400. The image capture device 400 may include more than three power sources 400 are present.

In some implementations, if all three power sources 400 are present (e.g., the USB source 410, the removable battery 412, and the integrated internal battery 414 are all present), then the image capture device 404 may draw power from the power sources 400 based on a priority. In some implementations, the priority may be that the image capture device 404 draws power from the USB source 410 before drawing power from the removable battery 412 and before drawing power from the integrated internal battery 414. In some implementations, the priority order may be different, as long as the integrated internal battery 414 is the last power source that the image capture device 404 draws power from.

The integrated internal battery 414 may not be present, and then the image capture device 404 draws power from either the USB source 410 or the removable battery 412. The USB source 410, the removable battery 412, and the integrated internal battery 414 may be the same type of power source, different types of power sources, rechargeable, disposable, Aluminum-ion, lead-acid, lithium ion, magnesium ion, metal air electrochemical cells, nickel-cadmium, nickel-metal hydride, or a combination thereof.

Figure 5:
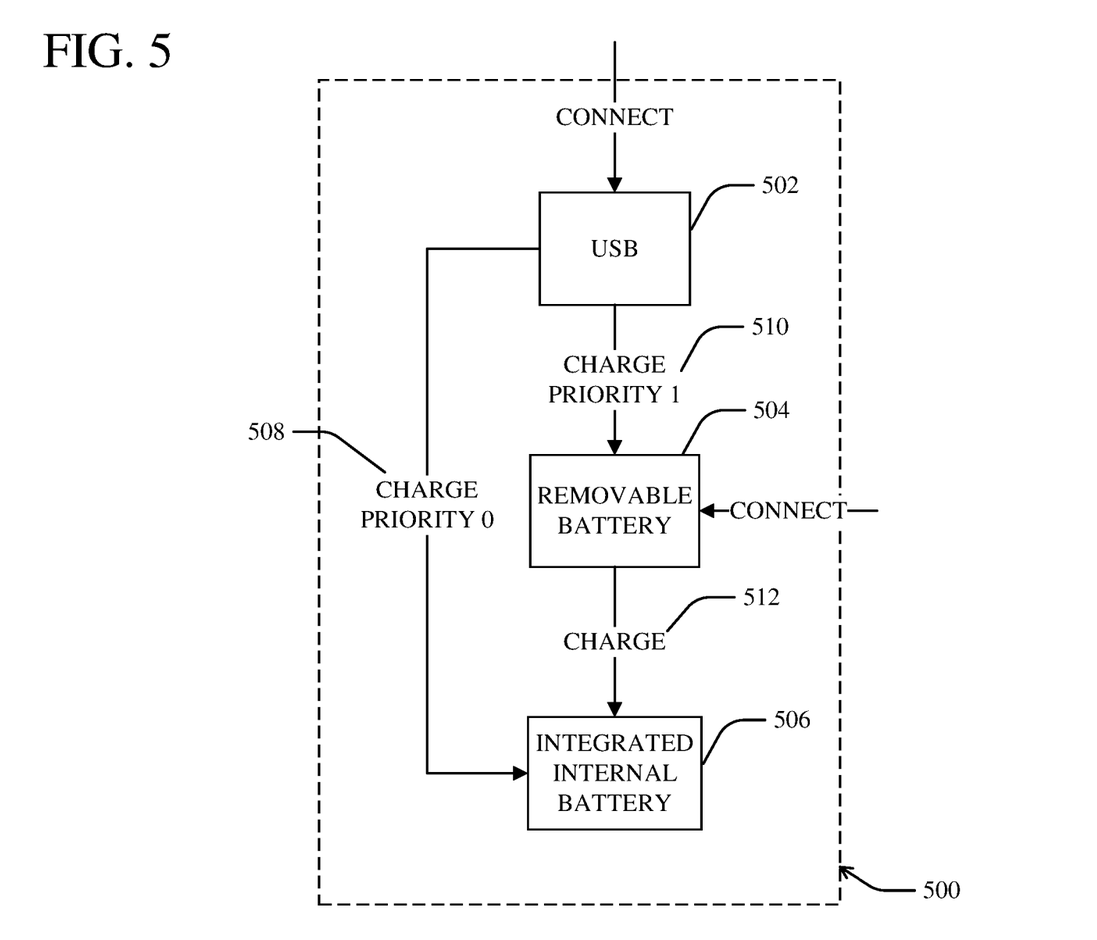
FIG. 5 is a flow diagram of battery charging logic in an image capture device.

FIG. 5 is a flow diagram of battery charging logic 500 of an image capture device (not shown) such as the image capture device 404 of FIG. 4. The possible power sources include a USB source 502, a removable battery 504, and an integrated internal battery 506. If the USB source 502 is connected to the image capture device and is suitable to provide power, then the USB source 502 powers the image capture device. The USB source 502 is "suitable" if it is capable of providing sufficient power to power the image capture device 400 (e.g., the USB source 502 has 20 percent or more remaining power or even 10 percent or more remaining power (of a power capacity)). The USB source 502 also charges the integrated internal battery 506 by supplying a charge 508. This is shown in FIG. 5 as a charging priority 0. The integrated internal battery 506 is charged with a high priority because if the USB source 502 is disconnected and if no removable battery 504 is connected, then the image capture device will draw power from the integrated internal battery 506.

After the integrated internal battery 506 has been charged, and if the removable battery 504 is connected, then the removable battery 504 is charged by the USB source 502 by supplying a charge 510. This is shown in FIG. 5 as a charging priority 1; in this instance, a charging priority 1 is lower than the charging priority 0. The integrated internal battery 506 is charged with a higher priority than the removable battery 504. If the USB source 502 is not connected and the removable battery 504 is connected, then the removable battery 504 powers the image capture device and charges the integrated internal battery 506 by supplying charge 512. With the integrated internal battery 506 present, a user of the image capture device can continue to capture media for a limited period of time, even if no other power source (e.g., a USB source 502 or a removable battery 504) is connected to the image capture device to provide power.

Figure 6:
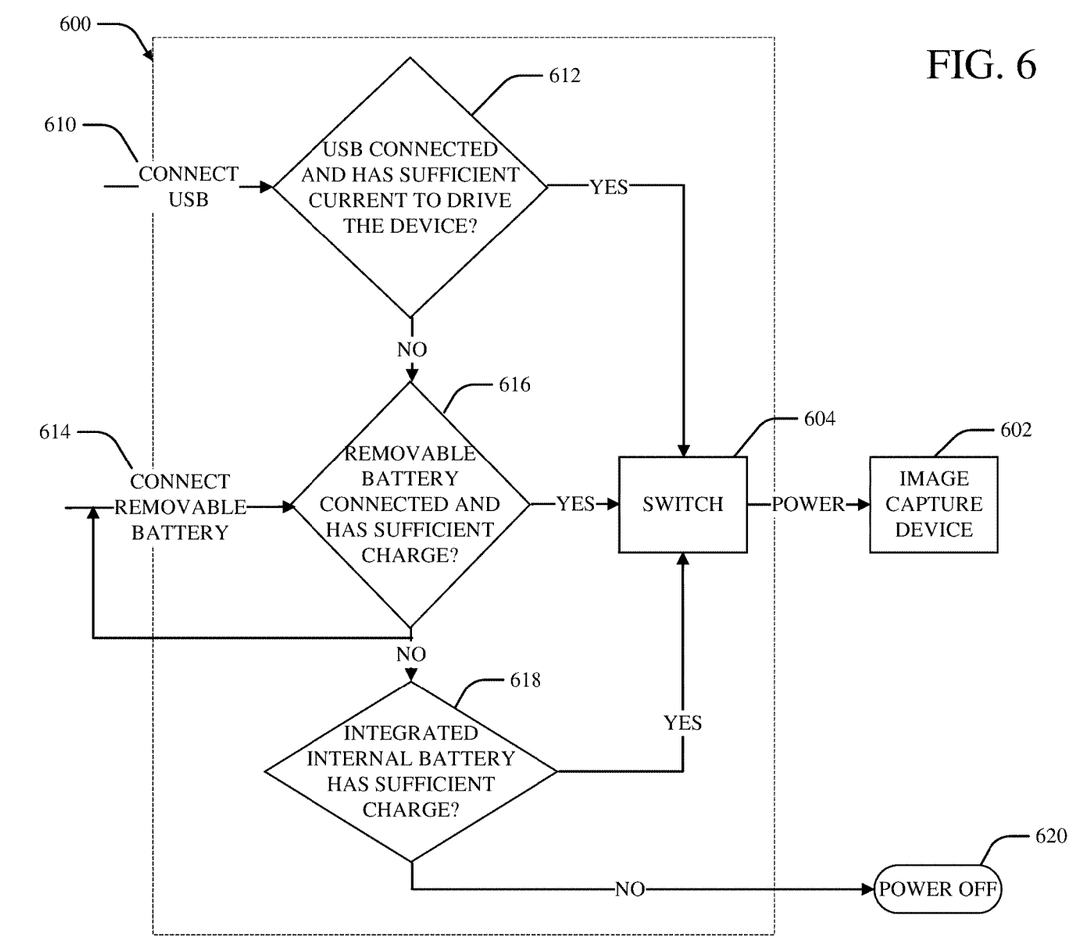
FIG. 6 is a flow diagram showing operation of power source logic in an image capture device.

FIG. 6 is a flow diagram showing operation of device power source logic 600 in an image capture device 602 that may be similar to the image capture device 404 of FIG. 4. The device power source logic 600 provides power to the image capture device 602 via a switch 604. If a USB source 610 is connected and has sufficient current (e.g., 1 amp or more or 2 amps or more) to drive the image capture device 602 (operation 612, "yes" branch), then the switch 604 is controlled to facilitate providing power to the image capture device 602 from the USB source 610.

If the USB source 610 is not connected or does not have sufficient current to drive the image capture device 602 (operation 612, "no" branch), and if a removable battery 614 is connected and has sufficient charge (e.g., 20 percent or more battery is charged or 20 percent or more of an energy capacity is within the battery) to drive the image capture device 602 (operation 616, "yes" branch), then the switch 604 is controlled to facilitate providing power to the image capture device 602 from the removable battery 614.

If the USB source 610 is not connected and the removable battery 614 is not connected or does not have sufficient current to drive the image capture device 602 (operation 616, "no" branch), then a determination is made whether an integrated internal battery has sufficient charge to drive the image capture device 602 (operation 618). If the integrated internal battery has sufficient charge (e.g., sufficient energy) to drive the image capture device 602 (operation 618, "yes" branch), then the switch 604 is controlled to facilitate providing power to the image capture device 602 from the integrated internal battery. If the integrated internal battery does not have sufficient charge (e.g., sufficient energy) to drive the image capture device 602 (operation 618, "no" branch"), then the image capture device 602 is powered off (operation 620).

If at any time after operation 612, the "no" branch is performed, and if a USB source 610 is connected, operation 612 may be performed again. If at any time after operation 616, the "no" branch is performed, and if a new removable battery 614 is connected, operation 616 may be performed again. With multiple power sources potentially available for the image capture device 602 to draw power from, a user of the image capture device 602 may be able to extend an image capture session without interruption by changing power sources when an existing power source (e.g., a removable battery 614) runs low on power.

The image capture device 602 may not include an integrated internal battery. In such instances, the power source (either the USB source 610 or the removable battery 614) is evaluated to determine if the power source has sufficient energy to drive all of the features of the image capture device 602 that have been activated by a user. This determination is made using the device power source logic 600. The device power source logic 600 may suggest alternate settings of the image capture device 602 based on a current power level of the power source. For example, the device power source logic 600 may suggest a lower resolution for the image capture device 602 than a resolution currently selected by a user, so that an image capture session may be initiated or continued. By suggesting alternate or adjusted settings for the image capture device 602 in a user-friendly manner, a user may continue to use the image capture device 602 at the current power level.

Figure 7:
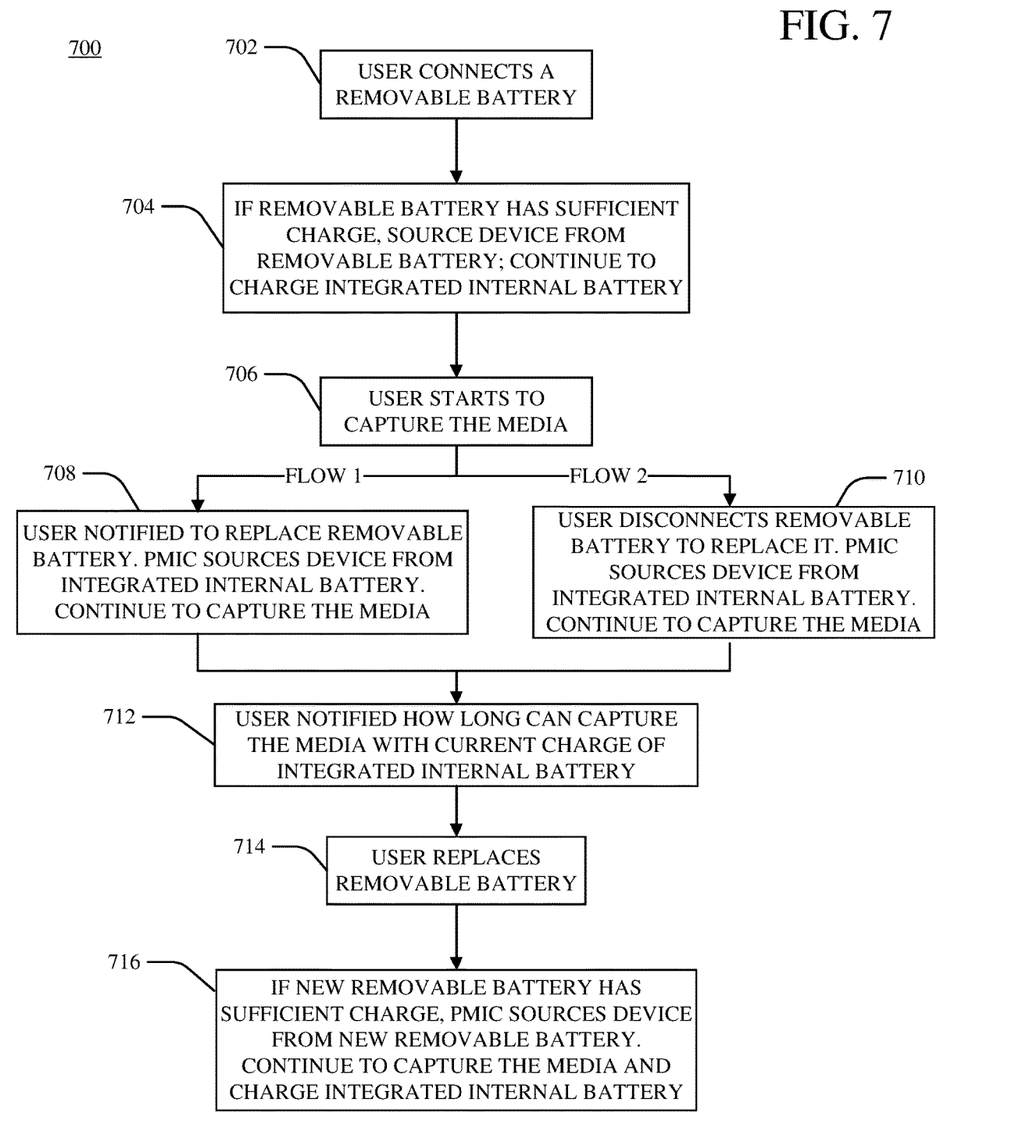
FIG. 7 is a flow diagram of illustrating power management of an image capture device when multiple power sources are present.

FIG. 7 is a flow diagram illustrating power management 700 of an image capture device when multiple power sources are present. The image capture device may be similar to the image capture device 404 shown in FIG. 4. The user connects a removable battery to the image capture device (operation 702). A power management integrated circuit (PMIC) recognizes that the removable battery has been connected. If the removable battery has sufficient charge (e.g., the battery has 20 percent or more, 40 percent or more, 50 percent or more of a remaining energy), the image capture device sources its power from the removable battery. The removable battery may also charge an integrated internal battery as needed (operation 704). The user then starts to capture media by, for example, starting to record a video with the image capture device (operation 706).

In a first operational flow (Flow 1 in FIG. 7), when the removable battery discharges to a certain threshold (e.g., 20 percent or less, 10 percent or less, or even 5 percent or less) (this threshold may be preset by a manufacturer or may be a setting adjustable by the user), the user is notified to replace the removable battery. While the removable battery has been disconnected for replacement, the PMIC sources power for the image capture device from the integrated internal battery to allow the image capture device to continue capturing the media (for example, to continue recording the video; operation 708).

In a second operational flow (Flow 2 in FIG. 7), the user notices that the charge on the removable battery is low and desires to replace the removable battery. When the user disconnects the removable battery, the PMIC recognizes that the removable battery has been disconnected, and then sources power for the image capture device from the integrated internal battery to allow the image capture device to continue capturing the media (for example, to continue recording the video; operation 710).

After the first operational flow (operation 708) or the second operational flow (operation 710), the user is notified how long the image capture device can continue to capture the media (for example, to continue recording the video) with the current charge of the integrated internal battery (operation 712). The user then replaces the removable battery (operation 714) with a new removable battery or a recharged version of the original removable battery, for example. The PMIC recognizes when the removable battery has been replaced with the new removable battery, and if the new removable battery has sufficient energy, the PMIC sources power for the image capture device from the new removable battery. The user can continue to capture the media (for example, to continue recording the video) until the user stops the capture. The new removable battery is also used to recharge the integrated internal battery (operation 716).

By having the integrated internal battery present and charged, the user can continue to capture media while the removable battery is replaced with a new or recharged removable battery, without having to interrupt the image capture session.

Figure 8:
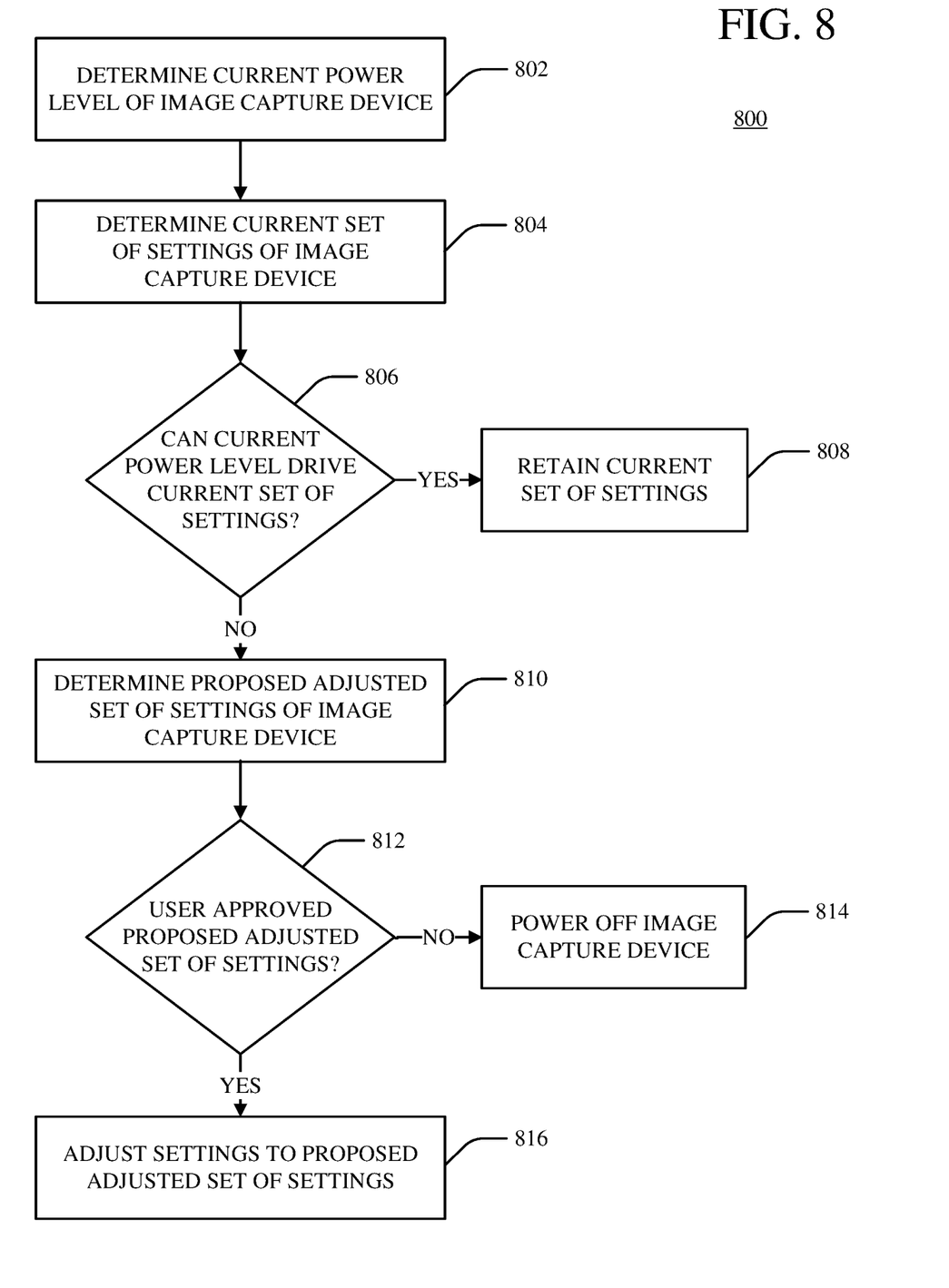
FIG. 8 is a flow diagram illustrating adjusting settings of an image capture device based on a current power level of the image capture device.

FIG. 8 is a flow diagram of a method 800 for adjusting settings of an image capture device based on a current power level of the image capture device. The image capture device may be similar to the image capture device 404 shown in FIG. 4. The image capture device can include a small internal battery (e.g., a small button cell-type battery) that can retain a clock setting and other settings of the image capture device for a few months in the event that a user does not use the image capture device for an extended period of time and has not connected any other power source to the image capture device. The small internal battery may not have sufficient power to drive the image capture device in a normal operating mode (e.g., not enough power to initiate or continue an image capture session). If the user attempts to operate the image capture device a after an extended time period, such as after a few months, without connecting a fully charged battery or a fully charged USB source, there might not be enough power to drive the image capture device with the saved settings. Implementing the method 800 described herein will allow the user to operate the image capture device with alternate settings that the image capture device can support based on its current energy level.

In the method 800, a current energy level of the image capture device is determined (operation 802). A current set of settings of the image capture device is determined (operation 804). A determination is made whether the current energy level of the image capture device can drive the current set of settings of the image capture device (operation 806). If the current energy level can drive the current set of settings (operation 806), then the current set of settings is retained by the image capture device (operation 808).

If the current energy level cannot drive the current set of settings (operation 806), then a proposed adjusted set of settings of the image capture device is determined (operation 810). The proposed adjusted set of settings is based on the current energy level of the image capture device. For example, the proposed adjusted set of settings may include a lower resolution of the image capture device than a currently selected resolution. In another example, the proposed adjusted set of settings may include operating the image capture device without powering a display of the image capture device. Changing other settings or changing a group of settings may also be proposed. A change of settings from the current set of settings to the proposed adjusted set of settings would permit the user of the image capture device to use the image capture device at the current energy level.

The proposed adjusted set of settings can be presented to the user of the image capture device. If the user does not approve the proposed adjusted set of settings (operation 812), then the image capture device is powered off (operation 814). If the user does not approve the proposed adjusted set of settings (operation 812), the method may returns to operation 810 to determine a new proposed adjusted set of settings. If the method returns to operation 810 the new proposed adjusted set of settings may then be sent to the user for approval (operation 812).

If the user approves the proposed adjusted set of settings (operation 812), the settings of the image capture device are adjusted or modified from the current set of settings to the proposed adjusted set of settings (operation 816).

In some implementations, the method 800 may be modified to work in conjunction with the method 600 and/or the method 700. For example, if the user of the image capture device does not replace the removable battery when it needs to be replaced or does not connect a USB source to the image capture device, the modified method 800 may begin with operation 806 as described above. In such circumstances, the user would be able to continue to use the image capture device with the proposed adjusted set of settings until the power source is depleted and the image capture device powers off or until the user replaces the removable battery or connects a USB source.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system configured to continuously supply power to an image capture device during an image capture session, the system comprising:
   an integrated internal battery located internal to the image capture device;
   a removable battery removably connected to the image capture device; and
   a power management integrated circuit located internal to the image capture device, the power management integrated circuit configured to:
   provide power to the image capture device from the removable battery;
   detect when the removable battery is disconnected from the image capture device;
   provide power to the image capture device from the integrated internal battery when the removable battery is disconnected from the image capture device;
   detect when a new removable battery is connected to the image capture device; and
   provide power to the image capture device from the new removable battery when the new removable battery is connected to the image capture device,
   wherein power is continuously supplied to the image capture device from the integrated internal battery while the removable battery is disconnected and replaced with the new removable battery.

2. The system of claim 1, further comprising:
   one or more USB power sources that are configured to power the image capture device, charge the removable battery, charge the new removable battery, charge the integrated internal battery, or a combination thereof.

3. The system of claim 2, wherein the power management integrated circuit charges the integrated internal battery before the removable battery or the new removable battery when the one or more USB power sources are detected.

4. The system of claim 2, wherein the power management integrated circuit is further configured to:
   power the image capture device and charge the integrated internal battery or the removable battery if the power management integrated circuit determines that the one or more UBS power sources have sufficient energy.

5. The system of claim 4, wherein sufficient energy is 20 percent of total energy capacity remaining or more.

6. The system of claim 1, wherein the power management integrated circuit is further configured to:

monitor a power draw of the image capture device and determine if the power draw is sustainable with a current set of settings.

7. The system of claim 6, wherein the power management integrated circuit is further configured to:
change the current set of settings if a current energy level cannot drive the current set of settings.

8. A method of continuously supplying power to an image capture device during an image capture session, the method comprising:
providing power to the image capture device from a removable battery connected to the image capture device;
detecting when the removable battery is disconnected from the image capture device;
providing power to the image capture device from an integrated internal battery of the image capture device when the removable battery is disconnected from the image capture device;
detecting when another removable battery is connected to the image capture device; and
providing power to the image capture device from the other removable battery when the other removable battery is connected to the image capture device;
wherein power is continuously supplied to the image capture device from the integrated internal battery while the removable battery is disconnected and replaced with the other removable battery.

9. The method of claim 8, further comprising:
charging the integrated internal battery with the removable battery and/or the other removable battery.

10. The method of claim 8, further comprising:
providing power to the image capture device from one or more USB power sources that are configured to power the image capture device, charge the removable batteries, charge the integrated internal battery, or a combination thereof.

11. The method of claim 10, further comprising:
charging the integrated internal battery before charging the removable battery with the one or more USB power sources.

12. The method claim 10, further comprising:
switching from charging the integrated internal battery to the removable battery when the integrated internal battery has a sufficient charge.

13. The method of claim 12, wherein the sufficient charge is when the integrated internal battery is 90 percent or more charged.

14. The method of claim 8, further comprising:
determining if a current power level of the image capture device can maintain a current set of settings; and
changing the settings of the image capture device if the current power level cannot sustain the current set of settings.

15. A method of adjusting settings of an image capture device based on a current power level of the image capture device, the method comprising:
determining the current power level of the image capture device;
determining a current set of settings of the image capture device;
determining whether the current power level can drive the current set of settings;
determining a proposed adjusted set of settings of the image capture device when the current power level cannot drive the current set of settings, wherein the proposed adjusted set of settings is based on the current power level and is different from the current set of settings; and
adjusting settings of the image capture device to the proposed adjusted set of settings after receiving confirmation from a user of the image capture device to use the proposed adjusted set of settings.

16. The method of claim 15, further comprising:
notifying the user how long the image capture device can continue operation with a current energy level.

17. The method of claim 15, further comprising:
notifying the user to replace a removable battery of the image capture device.

18. The method of claim 17, further comprising:
charging an integrated internal battery of the image capture device with the removable battery when the removable battery is connected to the image capture device.

19. The method of claim 15, further comprising:
charging an integrated internal battery, a removable battery, or both of the image capture device when a USB power source for the image capture device is detected.

20. The method of claim 19, further comprising:
switching from charging the integrated internal battery to charging the removable battery when the integrated internal battery reaches or surpassed a sufficient charge.

* * * * *